Oct. 15, 1957  L. T. AKELEY  2,810,085
HYSTERESIS MOTORS
Filed Jan. 31, 1955  3 Sheets-Sheet 1

Inventor:
Lloyd T. Akeley
by, Richard E. Hosley
His Attorney

Inventor:
Lloyd T. Akeley
by. *Richard E Horley*
His Attorney

Oct. 15, 1957 L. T. AKELEY 2,810,085
HYSTERESIS MOTORS
Filed Jan. 31, 1955 3 Sheets-Sheet 3

Inventor:
Lloyd T. Akeley
by, Richard E. Healey
His Attorney

United States Patent Office 2,810,085
Patented Oct. 15, 1957

2,810,085

HYSTERESIS MOTORS

Lloyd T. Akeley, Topsfield, Mass., assignor to General Electric Company, a corporation of New York Application January 31, 1955, Serial No. 485,230

13 Claims. (Cl. 310—162)

The present invention relates to hysteresis motors and, more particularly, to improved electrical motors of the hysteresis type, and the method for making same, involving circumferential windings of hysteresis material.

In the usual hysteresis motor, the revolving electromagnetic field produced by an electrically excited stator winding induces poles in hysteresis material of the rotor structure, and, because of the magnetic retentivity of such material, torques are developed to occasion rotation of the rotor structure. The materials employed in the fabrication of such rotor structures are particularly critical when improved motor efficiency, maximum torque, and good starting and running characteristics are to be realized. Unfortunately, optimum known materials for this purpose are not only very difficult to machine and process in the customary manner but also include scarce and expensive elements. Further, it has been discovered that the grain orientations of such materials as they appear in the finished rotors have a pronounced effect upon motor operation.

In accordance with the present teachings, hysteresis motor rotors include but a thin shell of hysteresis material which has been formed such that it is grained-oriented, the grain running wholly in the paths desired to occasion improved maximum watts loss and torque. Preferably, the hysteresis material is drawn into wire shape, although it may also be pressed into flat stock and cut into short strips, and the wire or flat strip is wrapped peripherally around or into a rotor member which may be of a material exhibiting no or relatively low hysteresis characteristics. The amount of hysteresis material utilized in my rotor construction is very small as compared with the amounts of material required in the usual laminated or solid-disk types of hysteresis rotors, and scrap is virtually eliminated. As appears more fully hereinafter, the novel method for realizing improved motor constructions is also readily and simply practised.

One object of the instant invention is to provide a novel and improved method for making hysteresis motors.

Further, it is an object to provide hysteresis motors which utilize a minimum of critical materials and which have hysteresis materials with grain orientations yielding highly improved motor performance characteristics.

By way of a summary statement of but one aspect of this invention, a mass of material evidencing suitable hysteresis characteristics is drawn into wire form with a cold reduction of between 70 and 90 percent. This wire is then wrapped into a tight single-layer helix on a mandrel, heat-treated, and fixed in an annularly channeled motor rotor element of some different material which would not interfere with operation of the rotor structure in a hysteresis motor. When this assembled rotor element and helix is placed in a cooperative relationship with a stator producing a rotating magnetic field, improved motor torque characteristics are developed. In the 70–90 percent cold reduction by drawing, the grain of all the hysteresis material is caused to run longitudinally along the wire, and the subsequent heat treatment is only sufficient to preserve a generally helical shape of the wire, without altering the grain orientations. As the wire is disposed circularly about the axis of rotation of the motor rotor, the grain of all the hysteresis material is likewise arranged circularly and for the majority of its length has its grain direction parallel to the flux lines coming from the stator field, which is the condition sought to be produced.

Although the features of this invention which are believed to be novel are set forth in the appended claims, the details of the invention itself and further objects and advantages thereof may be readily comprehended through reference to the following description taken in connection with the accompanying drawings, wherein:

Figure 1 details the steps in my method for producing improved hysteresis motors;

Figure 5:
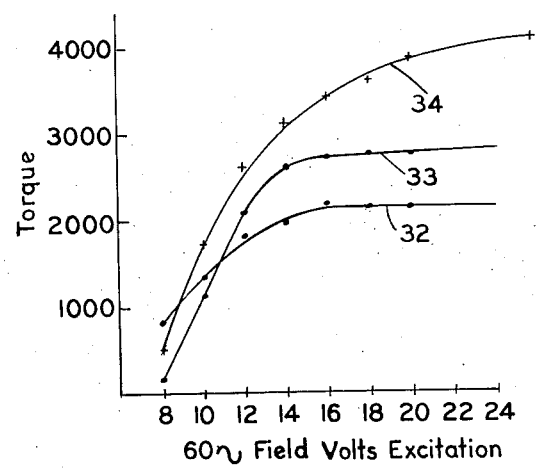
Figure 6:
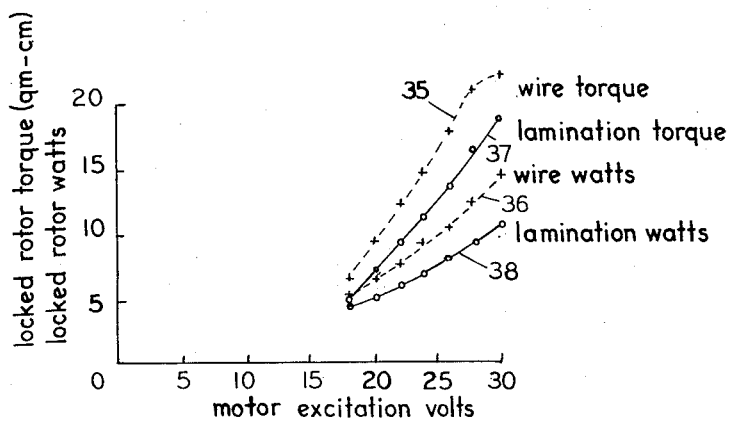
Figure 7:
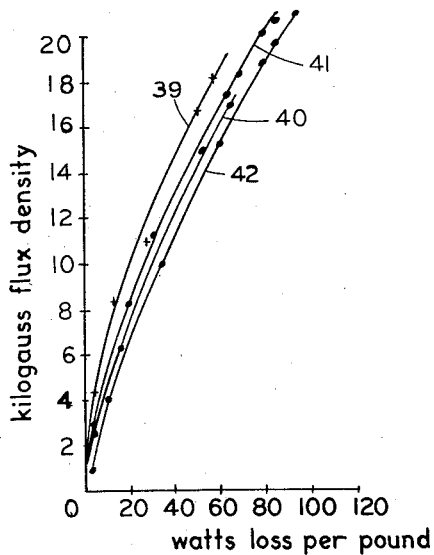
Figure 8:
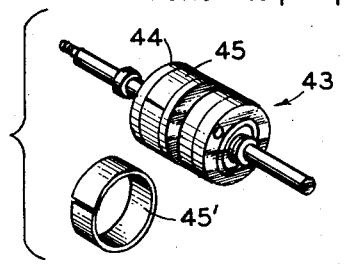

Figure 5 provides a plot of rotor torque vs. field excitation for a disk-type rotor and for two grain-oriented wound rotors in a synchronous motor of a tachometer indicator;

Figure 6 is a plot of locked rotor torque and watts vs. motor excitation for a laminated rotor and for a grain-oriented wire rotor in a synchronous motor of a gyro motor;

Figure 7 plots flux density vs. watts loss per pound for grain-oriented wire and sheet coils and for standard punchings and sheet material having grain improperly oriented; and Figure 8 depicts a tachometer motor rotor structure employing a grain-oriented sheet of hysteresis material wrapped about its periphery.

Figure 1:
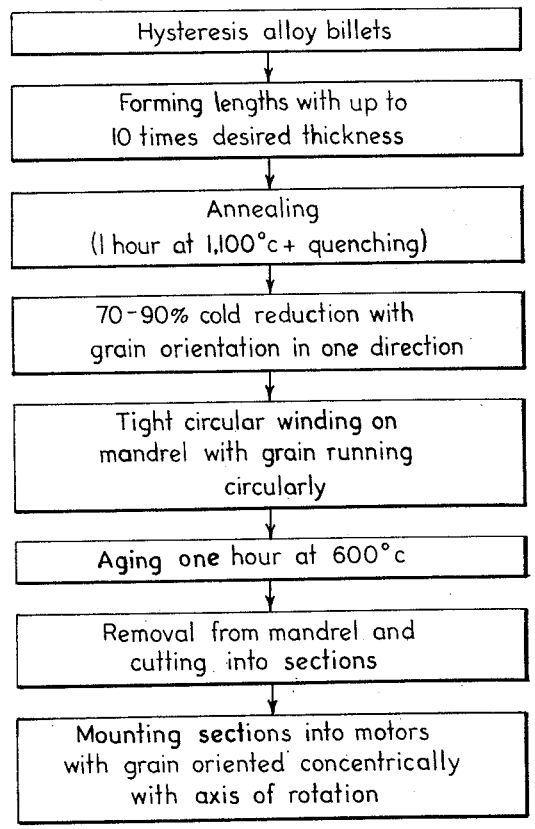

Referring to the schedule of steps recited in Figure 1, it is noted that the production of improved hysteresis motors is commenced with cast billets or other relatively large masses of hysteresis material which may be reduced in thickness by rollers or dies in cold reduction and annealing procedures. One particularly advantageous hysteresis material is the so-called "P-6" alloy, which includes 5-7 percent nickel, 4-6 percent vanadium, 43-47 percent cobalt, and a balance substantially all iron, as is described in U. S. Patent No. 2,596,705, for "Magnetic Alloy," assigned to the same assignee as that of the present application. The billet material is then cold worked such that it possesses a thickness of up to ten times that which the final hysteresis elements are to have, either in wire or strip form. This cold working may be performed without particular concern about grain orientations of the material. Upon reaching that first desired thickness, the material is ordinarily somewhat brittle and does not possess optimum directional and magnetic qualities. That these qualities may be developed, the material is first reduced to the conditions realized when the alloy was first cast, by an annealing process which includes heating for one hour at about 1,100° C. and a subsequent quenching in oil at room temperature. Thereafter, a 70–90 percent cold reduction is effected, by rolling, wire-drawing, or other suitable means, and this operation is performed such that there is an elongation principally in one direction. For example, successive wire-drawing steps must elongate the wire in one direction while reducing the cross-section, and, if a rolling operation is employed, the sheet being reduced in thickness should be rolled along the same path during each pass through rolls. The material having been cold worked to a 70–90 percent reduction in this manner, it is found that the grain of the hysteresis material runs in substantially a single direction, such as the direction of elongation. Next, the hysteresis material is tightly wrapped circularly about a circular mandrel having about the same diameter as that portion of a rotor element about which the hysteresis rotor material is to be placed. This wrapping of wire or sheet must be done such that grain of the hysteresis material runs circularly about the axis of the mandrel. An aging at 600° C. for about one hour is then performed while the material is held in place on the mandrel, with the result that the wrapped hysteresis material then tends to retain the circular configuration which it assumed about the mandrel. Subsequently, the aged hysteresis material is removed from the mandrel and cut into axial lengths or sections which lend themselves to assembly peripherally upon a rotor element. It is to be noted that the aging at 600° C. is not such as will result in alteration of the desired grain orientation but will merely enable the originally brittle and springy hysteresis material to retain its circular wound shape. The circular sections of grain-oriented hysteresis material are then fixed onto motor rotor elements in positions to interact with stator fields of the assembled hysteresis motors.

Figure 2:
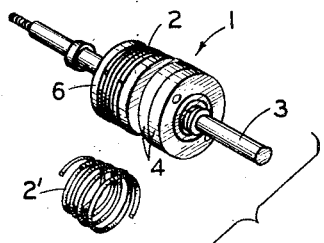
Figure 2 illustrates pictorially a helical rotor element constructed in accordance with these teachings, and an assembled rotor for a tachometer indicator.
Figure 3:
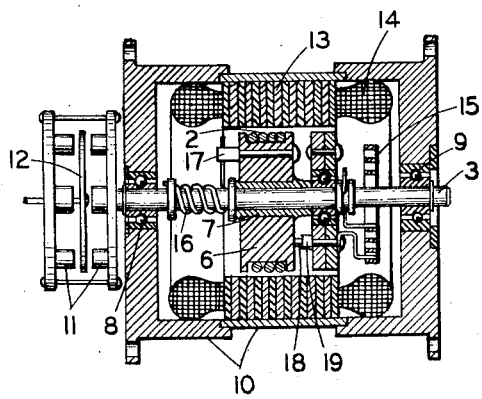
Figure 3 is a cross-sectioned side view of part of a tachometer indicator including an improved hysteresis motor arrangement.

In Figure 2 there is illustrated a rotor structure 1 which is utilized in the synchronous motor portion of a tachometer indicator, the helical hysteresis element 2 thereof, which is also shown in a separated view in the same figure with the same reference character bearing a prime accent, being formed and grain-oriented in accordance with the present teachings. Element 2 is depicted as constructed of drawn hysteresis wire of circular cross-section. Figure 3 provides a detailed showing of the same rotor structure in its cooperative relationship to the tachometer's synchronous motor stator assembly, and, in the interest of clarity and brevity, the same reference characters are employed to designate the same elements in both of Figures 2 and 3. Tachometer indicator motors must possess excellent starting characteristics at both high and very low frequency of excitation of their revolving stator fields, and they must be accurately synchronous. In occasioning these results, two rotor units are mounted on the rotor shaft 3, one of these being comprised of a pair of permanently magnetized disks 4 which are fixed together and supported on shaft 3 by low-friction bearings 5. The other rotor unit includes an annularly channeled element 6, which may be made of aluminum or other non-magnetic material, having the helical section 2 of grain-oriented hysteresis material fitted peripherally about the channeled portion with the material grain running circularly about the rotational axis of shaft 3. A sleeve bearing 7 provides support on shaft 3. In prior rotor structures of this general type, the hysteresis rotor unit commonly included ring laminations punched from sheet hysteresis material, or included disks formed from more massive stock of hysteresis material. Dies for blanking laminations of hard material are, of course, much more costly than the simple mandrels which are used with hard wire or strip materials.

Bearings 8 and 9 afford rotational support for the shaft 3 in the motor frame 10, the shaft in turn supporting a set of permanent magnets 11 in magnetically influencing relation to an eddy-current disk 12 which is spring-restrained and actuates a suitable pointer (not shown). Within frame 10, the stator comprised of laminations 13 and windings 14 generates a rotating magnetic field responsive to excitation from the usual remote tachometer generator, whereby the rotor structure is caused to turn in synchronism with the remote generator. For reasons which are not of particular import here, rotor disks 4 are coupled with shaft 3 through a resilient spiral 15, rotor element 6 is coupled with shaft 3 through a stiffer spring 16 when the rotor tab 17 engages that spring, and stops 18 and 19 prevent the two rotor units from becoming displaced more than 360 degrees. Permanent magnet disks 4 occasion principal starting and running torques at low speeds, while the hysteresis helix 2 provides the major starting torques at high speeds and also moves the rotor shaft more nearly into synchronism with the revolving stator field at high speeds. Additional detail as to such apparatus generally is set out in the copending application of Richard E. Anderson, Serial No. 459,419, filed September 30, 1954, for "Oscillation Suppressed Tachometer Indicator," assigned to the same assignee as that the present application.

As compared with hysteresis rotor units made of hysteresis disks or laminations, the unit having wound wire hysteresis material with circular grain orientation evidences considerably heightened torque and watts loss. Further, a very appreciable saving of hysteresis material is effected. It should also be understood that the manufacturing techniques have been vastly simplified in that the drawing and cutting of wire are more readily accomplished than are the rolling of sheet and the punching out of accurately dimensioned annular laminations. In the cases of disks and laminations, the grain orientations are either random or in principal directions out of correspondence with the circular patterns which practise of my invention realizes, and it is for this prime reason that bettered motor characteristics are secured through these teachings.

I am aware that others have described the construction of different types of motors utilizing wire and strip material. For example, steel wire has been wrapped in helical form, and in spiral form, and as a helical torus, to produce a motor rotor structure. However, such earlier motors are believed to be of the reluctance rather than hysteresis type, and the rotor materials thereof are not grain-oriented in the manner here shown to be distinctly advantageous.

While an external peripheral rotor winding has been illustrated in Figures 2 and 3, a second embodiment of particular utility makes use of an internal winding for an inside-out motor construction, such as that of the gyro rotor structure depicted in an "exploded" relationship in Figure 5. This rotor structure is of a symmetrical type having a pair of rotor elements which spin about a common axis, one on each side of a flat support plate, as taught in the copending application of Harry C. Wendt, Serial No. 325,577, filed December 12, 1952, for "Symmetrical Gyroscope," assigned to the same assignee as that of the present application. In this type of gyroscope rotor structure, there are two umbrella-shaped rotor halves, such as rotor half 20, which are disposed for rotation on opposite sides of a flat rectangular support plate 21 having minor axis trunnions 22. The rotor halves are fixed with the spin axis shaft 23; bearing units such as that identified by numeral 24 mount shaft 23 on plate 21; and flanged tubular members 25 and 26 mount the two motor stators 27 and 28 on the support plate 21. Each rotor half includes an element 29 on which is shrunk a heavy annular ring 30, preferably of tungsten. Heretofore, annular laminations of hysteresis material have been stacked within the rotor element 29 such that hysteresis motor interaction takes place between them and the rotating stator field of stator 28 when the stator and rotor components are nested together compactly. As shown, however, these laminations may be advantageously replaced by helical windings of grain-oriented hysteresis material, one of which windings is designated by reference character 31. The separate helical winding 31' in that figure illustrates the shape of the winding prior to its insertion in the accommodating annular channel on the inner surface of rotor element 29. It should be noted that the wire material thereof is of rectangular cross-section, an arrangement which makes particularly effective utilization of the hysteresis material within confined spaces. Grain of the hysteresis material runs predominately parallel with the longitudinal axis of the wire and is thus directed circularly about the axis of rotation of the rotor, which is the orientation yielding optimum torque and watts loss in the hysteresis material. The winding as it is removed from the mandrel and cut into sections is preferably somewhat oversized and thus fits securely within rotor element 29. Brazing, lacquering, or other additional securing techniques may be employed to insure that slippage of the winding will not occur. In connection with winding 31, as well as winding 2 in Figures 2 and 3, it is perceived that the hysteresis wire may be of very small thickness, with a consequent economy of critical material, and that the radial thicknesses may be considerably smaller than would usually be considered practical with punched laminations.

The extraordinary characteristics of hysteresis motors having grain-oriented and circularly wound wire rotors may be readily perceived through reference to the graphs which comprise Figures 5 through 7. For purposes of obtaining the data appearing in the plots of Figure 5, a tachometer indicator such as that of Figure 3 was used, the resulting motor torques being measured in terms of deflection of a pointer moved by the eddy-current drag disk restrained by a conventional spiral spring. These motor torques are plotted against 60 cycle field voltage applied as the motor excitation when three different hysteresis rotor units were used. Curve 32 resulted from data procured with a hysteresis rotor composed of two staked cunife disks, each 0.735 inch in diameter and 0.080 inch thick. Curve 33 was plotted from data obtained with a hysteresis rotor having four separate turns of the aforementioned grain-oriented "P-6" alloy wire of circular cross-section, 0.031 inch thick and 0.730 inch in outer diameter, mounted on an aluminum hub. This wire material was given a 90 percent cold reduction to aid in establishing the desired grain pattern. Curve 34 represents the run wih a rotor having three separate turns of the "P-6" alloy wire of circular cross-section, 0.049 inch thick and 0.730 inch in diameter, mounted on an aluminum hub, the cold reduction in this instance being 75 percent. The increased torques realized with the grain-oriented wire rotor constructions at field excitations above small values are immediately apparent. For example, at an excitation of 20 volts the 0.049 inch wire yielded about 70 percent more torque than the cunife disks, and this despite a larger air gap in the case of the wire-wound rotor. The same larger air gap and reduced volume of material in the case of the 0.031 inch wire nevertheless enabled torques to be realized in excess of the cunife disks, also.

Figure 4:
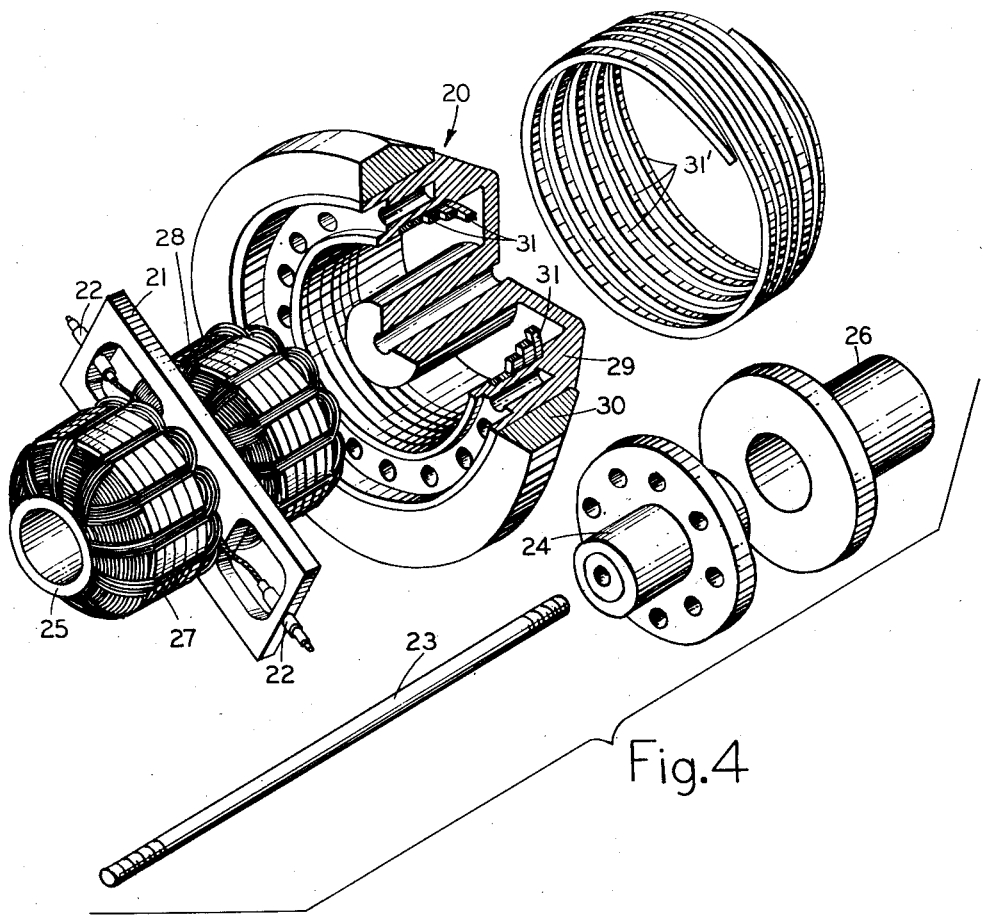
Figure 4 is a pictorial exploded view of part of a gyroscope rotor structure embodying this invention in an inside-out motor assembly, together with a further representation of a suitable rotor helix.

The results plotted in Figure 6 were obtained in tests conducted with a gyroscope motor of the type illustrated in Figure 4, two similar rotor halves being separately tested on the same stator, and the torque and watts measured being those under locked rotor or stalled conditions. Dashed line curves 35 and 36 represent the torque and watts, respectively, vs. motor voltage in a rotor arrangement having circular cross-section "P-6" wire 0.049 inch thick and having a 75 percent cold reduction in the grain-orienting process. Solid line curves 37 and 38, on the other hand, represent the torque and watts, respectively, vs. motor voltage in a similar gyro rotor half provided with "P-6" alloy laminations punched from sheet 0.010 inch thick and having a 90 percent cold reduction—but, without having grain orientation circularly about the motor axis as taught by this invention. Each of the separately tested rotor halves had an inside diameter and volume of "P-6" alloy like those of the other, such that the principal variable was that of grain orientation of the hysteresis material. Stall, or locked rotor, torque was measured inasmuch as that torque is critical in gyroscopes which must accelerate from standstill to high spin speeds in very short intervals. The curves 35 and 37 illustrate that the grain-oriented wound rotor produces about 30 percent more stall torque at given stator excitation voltages, which represents a most decided improvement. As would be expected, curves 36 and 38 show that the increased stall torque of the wound rotor is accompanied by increased rotor watts hysteresis loss as compared with the laminated rotor having a grain pattern which is not oriented in the prescribed manner. Greater hysteresis losses of course result in more improved hysteresis motor performance.

The advantageous higher hystersis losses realized with hysteresis materials having grain oriented in the direction of excitation flux travel are further emphasized by the test results plotted in Figure 7. Flux density in the materials is represented by the ordinate figures, while hysteresis loss figures appear along the abscissa. Curve 39 was obtained from measurements with 60 cycle flux excitation of a sheet of "P-6" alloy 0.010 inch thick which had undergone a 90 percent cold reduction, the grain of the material being perpendicular to the direction of flux travel. Curve 40 resulted from measurements of material of like dimensions and cold reduction, except that the grain in that instance was parallel to the direction of flux travel. The magnified hysteresis losses per pound in the latter material establish the greater efficacy of such properly oriented hysteresis motor material. In further confirmation, curve 41 evidences the lower losses per pound experienced when the same material is formed into a ring punching wherein the excitation flux flows around the ring but the material grain is parallel to one diameter only. It should be apparent that the flux circulation is then partly with, partly across, and partly in intermediate angular relationships with the grain, and that optimum performance cannot be secured under these conditions. A 0.049 inch diameter wire coil of the same material, having but a 75 percent cold reduction, yielded the results plotted in curve 42, wherein even bettered hysteresis losses per pound are demonstrated when the excitation flux flows along the wire. Further cold reduction, as to 90 percent, yet improves the hysteresis loss per pound.

Although wire forms of grain-oriented hysteresis material are preferred for rotor constructions, the cardinal advantages of my method and apparatus are also brought about when the hysteresis material is made in grain-oriented sheet form and the sheet material is wrapped circularly about a rotor element such that the grain runs circularly about the axis of rotor rotation. One suitable arrangement of this type is presented in Figure 8, wherein the rotor 43 is that of a tachometer indicator such as that of Figure 2. There the rotor hub 44 of aluminum or other material is encircled by a curved sheet 45 of hysteresis material. In a separated showing in that figure, the sheet is identified by reference character 45'. Grain of the hysteresis material runs circularly in the direction of curvature, the material having been grain-oriented and shaped to possess this grain pattern in the manner hereinbefore described. Sheet material of this type may also replace wire or laminations in inside-out motor constructions exemplified in Figure 4, of course.

In each of the disclosed arrangements, the grain of the rotor material has been everywhere aligned with the directions of the lines of stator flux, and it is this relationship which is of major importance. The principal stator fields of hysteresis motors travel paths which are substantially circumferential, that is, the lines of flux between circumferentially adjacent stator poles of different polarity are also substantially circumferential and circular. Accordingly, the grain of the hysteresis material on the rotor is also circular in each instance.

It should be apparent that the specific embodiments of this invention disclosed herein are of a descriptive rather than a limiting nature and that various changes, combinations, substitutions, or modifications may be employed in accordance with these teachings without departing in spirit or scope from this invention in its broader aspects.

What I claim as new and desire to secure by Letters Patent of the United States is:

1. The method of making a hysteresis motor which comprises forming a hysteresis alloy into a length of grain oriented material having its grain oriented predominately in one direction, and mounting said grain-oriented material on the rotor structure of a hysteresis motor to form a rotor surface with the grain thereof running substantially parallel to lines of stator flux passing through said surface.

2. The method of making a hysteresis motor which comprises forming a hysteresis alloy into a length of grain oriented material having its grain oriented predominately in one direction, and mounting said grain-oriented material on the rotor structure of a hysteresis motor to form a rotor surface with the grain thereof running circularly about the axis of rotation of said motor.

3. The method of making a hysteresis motor which comprises cold-reducing a hysteresis alloy into a length of material having substantially all grain oriented in one direction, shaping said grain-oriented material such that the grain thereof runs circularly about a given axis, heating said material such that it preserves both said shape and said grain orientation, and thereafter mounting said material on the rotor structure of a hysteresis motor to form a rotor surface with the grain thereof running circularly about the axis of motor rotation.

4. The method of making a hysteresis motor which comprises forming a mass of annealed hysteresis material, next performing a 70–90 percent cold reduction of said material such that the grain of said material is oriented in substantially one direction, wrapping the grain-oriented material about a substantially cylindrical mandrel with the grain thereof running circularly about the axis of said mandrel, aging said wrapped material on said mandrel at about 600° C. for about one hour to set the shape of said material to conform to that of said mandrel, removing said material from said mandrel, and mounting said grain-oriented circular material on the rotor structure of a hysteresis motor with the grain thereof running circularly about the axis of rotation of said motor.

5. The method of making a hysteresis motor which comprises forming hysteresis alloy billets into lengths, annealing each length of material, cold-reducing said material between 70–90 percent to realize said desired thickness and a grain oriented in substantially one direction, wrapping said material about a circular mandrel with said grain running circularly about the axis of said mandrel, heat-treating said material on said mandrel to set the shape of said material to conform to that of said mandrel while preserving said grain orientation, removing said material from said mandrel, cutting said material into sections of predetermined axial length, and mounting each of said sections of said material on the rotor structure of a hysteresis motor to form a rotor surface with the grain thereof running concentrically with the axis of motor rotation.

6. The method of making a hysteresis motor which comprises drawing hysteresis material into grain oriented wire form with a cold reduction yielding an orientation of the grain which is predominately parallel to the longitudinal axis of said wire, and mounting said wire on the rotor structure of a hysteresis motor to form a rotor surface with the grain thereof running concentrically with the axis of motor rotation.

7. The method of making a hysteresis motor which comprises forming hysteresis alloy billets, annealing each length of said material, drawing said length of material until there is a 70–90 percent cold reduction yielding wire having substantially all grain oriented longitudinally therein, winding said wire on a substantially cylindrical mandrel with said grain running circularly about the axis of said mandrel, heat-treating said wire on said mandrel to preserve the shape and grain orientation of said winding, removing said wire from said mandrel and cutting said wire into sections of predetermined axial length, and mounting each of said sections on the rotor structure of a hysteresis motor to form a rotor surface having substantially all grain thereof oriented concentrically with the axis of motor rotation.

8. A hysteresis motor comprising a stator producing motor flux travelling in substantially circular paths about the motor axis of rotation, grain oriented hysteresis rotor material having the grain thereof oriented predominately circularly about an axis, and means mounting said hysteresis rotor material for rotation about said motor axis with said grain parallel to said motor flux.

9. A hysteresis motor comprising a stator producing motor flux travelling in substantially circular paths about the motor axis of rotation, a substantially cylindrical rotor member of grain oriented hysteresis material having a grain orientation which is predominately circular, and means mounting said rotor member for rotation about said motor axis proximately with said stator and with the grain thereof parallel to said motor flux passing through said member.

10. A hysteresis motor comprising a stator producing motor flux travelling in arcuate paths about the motor axis of rotation, a hysteresis rotor member formed of hysteresis material which has undergone a 70–90 percent cold reduction orienting the grain of said material in substantially one direction, said rotor member being shaped to have all of said grain running circularly about an axis, and means mounting said rotor member for rotation about said motor axis with said grain parallel to said motor flux.

11. A hysteresis motor comprising a stator producing motor flux travelling arcuately about the motor axis of rotation, a hysteresis rotor member comprising hysteresis material which has undergone a 70–90 percent cold reduction orienting the grain of said material in substantially one direction, said rotor member being shaped into at least one substantially full circular turn with the grain of said material running circularly with said turn, and means mounting said rotor member proximately with said stator for rotation about said axis with said grain oriented substantially parallel with motor flux passing through said member.

12. A hysteresis motor as set forth in claim 11 wherein said rotor member comprises a thin sheet of said hysteresis material wrapped into circular form.

13. A hysteresis motor comprising a stator producing motor flux travelling arcuately about the motor axis of rotation, a hysteresis rotor member comprising hysteresis wire material which has undergone a 70–90 percent cold reduction in being drawn into wire having substantially all grain oriented longitudinally of said wire, said member having at least one substantially full circular turn with the grain of said material running circularly, and means mounting said rotor member proximately with said stator for rotation about said axis with said wire grain oriented substantially parallel with stator flux passing through said member.

References Cited in the file of this patent
UNITED STATES PATENTS

| | | |
|---|---|---|
| 1,075,882 | Walters | Oct. 14, 1913 |
| 1,487,913 | Belt | Mar. 25, 1924 |
| 1,992,822 | Granfield | Feb. 26, 1935 |
| 2,041,875 | Stoller | May 26, 1936 |
| 2,048,628 | Scott | July 21, 1936 |
| 2,140,365 | Lenehan | Dec. 13, 1938 |
| 2,221,812 | Nilson | Nov. 19, 1940 |
| 2,276,793 | Prince | Mar. 17, 1942 |